US011552660B2

(12) United States Patent
Takizawa et al.

(10) Patent No.: US 11,552,660 B2
(45) Date of Patent: Jan. 10, 2023

(54) WIRELESS COMMUNICATION CONTROL METHOD, RECEIVING STATION, AND NON-TRANSITORY STORAGE MEDIUM

(71) Applicant: TOYOTA JIDOSHA KABUSHIKI KAISHA, Toyota (JP)

(72) Inventors: Kenichi Takizawa, Koganei (JP);
Masafumi Moriyama, Koganei (JP);
Fumihide Kojima, Koganei (JP);
Atsushi Kurosawa, Fuchu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/496,251

(22) Filed: Oct. 7, 2021

(65) Prior Publication Data
US 2022/0123769 A1    Apr. 21, 2022

(30) Foreign Application Priority Data

Oct. 15, 2020   (JP) .............................. JP2020-174176

(51) Int. Cl.
*H04L 25/08* (2006.01)
*H04B 1/10* (2006.01)
(Continued)

(52) U.S. Cl.
CPC ............. *H04B 1/10* (2013.01); *H04B 17/345* (2015.01); *H04B 7/0413* (2013.01)

(58) Field of Classification Search
CPC .... H04B 17/318; H04B 1/1027; H04B 15/00; H04B 7/0617; H04B 52/243; H04B 24/00;
(Continued)

(56) References Cited

U.S. PATENT DOCUMENTS

| 2013/0188761 A1* | 7/2013 | Heikkila ................... H04L 1/20 375/349 |
| 2015/0249965 A1* | 9/2015 | Dussmann ............. H04B 7/024 455/501 |
| 2022/0116789 A1* | 4/2022 | Bertizzolo ........... H04B 7/0617 |

FOREIGN PATENT DOCUMENTS

EP            1 069 722 A2        1/2001

OTHER PUBLICATIONS

Zarikoff Brad W. et al.: "An iterative groupwise multiuser detector for overloaded MIMO applications", IEEE Transactions on Wireless Communications, vol. 6, No. 2, Feb. 2007, pp. 443-447, XP011184046, ISSN: 1536-1276, DOI: 10.1109/TWC.2007.05317.
(Continued)

*Primary Examiner* — Khai Tran
(74) *Attorney, Agent, or Firm* — Finnegan, Henderson, Farabow, Garrett & Dunner, LLP

(57) ABSTRACT

A wireless communication control method suppresses interference using an MMSE weight in an environment of wireless communication where the number of transmission stations transmitting a signal to a receiving station is larger than the number of reception antennas of the receiving station. The receiving station calculates power of an interference signal included in a signal received by the receiving station from the transmission stations the number of which is larger than the number of reception antennas, the interference signal corresponding to a part by which the number of transmission stations exceeds the number of reception antennas. The receiving station calculates the MMSE weight depending on the power of the interference signal, recalculates the power of the interference signal using the MMSE weight, and recalculates the MMSE weight depending on the recalculated power of the interference signal.

9 Claims, 11 Drawing Sheets

(51) Int. Cl.
  *H04B 17/345* (2015.01)
  *H04B 7/0413* (2017.01)
(58) Field of Classification Search
  CPC ............ H04B 72/0453; H04W 52/146; H04L 25/0202; H04L 2025/03414; H04L 1/0021
  USPC .......................................... 375/346, 329, 348
  See application file for complete search history.

(56) References Cited

OTHER PUBLICATIONS

Chen Min et al.: "Low-Complexity Channel Selection and Iterative Detection for Overloaded Uplink Multiuser MIMO OFDM System", 2006 IEEE 63rd Vehicular Technology Conference, IEEE, Jun. 2, 2013 (Jun. 2, 2013), pp. 1-5, XP032547744, ISSN: 1550-2252, DOI: 10.1109/VTCSPRING.2013.6692621.

Kazuki Takeda et al., "NR Physical Layer Specifications in 5G", NTT DOCOMO Technical Journal vol. 26 No. 3, pp. 47-58, Nov. 2018.

Horoshi Suzuki, "Signal Transmission Characteristics of Diversity Reception with Least-Squares Combining-Relationship between Desired Signal Combining and Interference Cancelling—," Transactions of the Institute of Electronics, Information and Communication Engineers, B-II vol. J75-B-II, No. 8, pp. 524-534, Aug. 1992.

Ryo Hayakawa et al., "An Overloaded MIMO Signal Detection Scheme with Slab Decoding and Lattice Reduction", IEICE Technical Report, RCC2015-16, MICT2015-16, pp. 77-82, May 2015.

Kenichi Higuchi et al., "Multi Antenna Wireless Transfer Technology III Signal Separation Technology in MIMO Multiplexing Method", NTT DoCoMo Technical Journal vol. 14 No. 1, pp. 66-75, Apr. 2006.

Ryo Hayakawa et al., "An Overloaded MIMO Signal Detection Scheme with Slab Decoding and Lattice Reduction", Proceedings of APCC2015, IEICE 14 SB 0087, 2015.

Kazuki Takeda et al., "NR Physical Layer Specifications in 5G", NTT DOCOMO Technical Journal vol. 20 No. 3, pp. 49-61, Jan. 2019.

Horoshi Suzuki, "Signal Transmission Characteristics of Diversity Reception with Least-Squares Combining-Relationship between Desired Signal Combining and Interference Cancelling—," Electronics and Communications in Japan, Part 1, vol. 76, No. 11, 1993, pp. 80-94.

* cited by examiner

FIG. 8

DEFINITION OF ABBREVIATED TERMS
- $ZF$ : Zero Forcing
- $r_1$ : PROPAGATION PATH VECTOR MULTIPLIED BY TRANSMISSION AMPLITUDE OF DESIRED SIGNAL
- $R_c$ : PROPAGATION PATH MATRIX MULTIPLIED BY TRANSMISSION AMPLITUDES OF DESIRED SIGNALS + CANCELED SIGNALS
- $R_u$ : PROPAGATION PATH MATRIX MULTIPLIED BY TRANSMISSION AMPLITUDE OF UNCANCELED SIGNALS
- $P_n$ : NOISE POWER PER RECEPTION ANTENNA
- $I$ : IDENTITY MATRIX
- $T$ : TRANSPOSE
- $*$ : COMPLEX CONJUGATE

FIG. 9

| PARAMETER | VALUE |
| --- | --- |
| THE NUMBER OF SIMULTANEOUS TRANSMISSION TERMINALS | 3-6 (TWO RECEPTION ANTENNAS) 5-10 (FOUR RECEPTION ANTENNAS) |
| THE NUMBER OF RECEPTION ANTENNAS | 2 or 4 |
| TRANSMISSION DATA SIZE | 80 bit |
| ERROR CORRECTION CODE (CODE RATE) | TURBO CODE (1/3) |
| MODULATION SCHEME | SINGLE CARRIER QPSK |
| PROPAGATION PATH (MAXIMUM DOPPLER FREQUENCY) | SINGLE-PATH RAYLEIGH FADING ($\approx$ 0Hz) |
| SIGNAL-TO-NOISE POWER RATIO (SNR) | 30 dB |

WIRELESS COMMUNICATION CONTROL METHOD, RECEIVING STATION, AND NON-TRANSITORY STORAGE MEDIUM

CROSS REFERENCE TO THE RELATED APPLICATION

This application claims the benefit of Japanese Patent Application No. 2020-174176, filed on Oct. 15, 2020, which is hereby incorporated by reference herein in its entirety.

BACKGROUND

1. Technical Field

The present disclosure relates to a wireless communication control method, a receiving station, and a non-transitory storage medium.

2. Description of the Related Art

There is a growing need to use a terminal connectable to a public network, such as the Internet, for control. Reduction in latency of wireless communication accessing the public network has been demanded. Multiple-Input and multiple-output (MIMO) is used for wireless communication. MIMO is a technology where a base station and terminals communicate in the same frequency band using multiple antennas for each. As for MIMO, a technology where multiple terminals engage in communication simultaneously (in parallel) is called multi-user MIMO. In recent years, due to development of Internet of Things (IoT), rapid increase of the number of wireless terminals used for IoT has been predicted, and there are growing concerns about uplink capacity shortage.

As for wireless communication, communication procedures called configured grant (CG) are specified. According to the CG, the base station preliminarily transmits, to terminal apparatuses, transmission parameters that designate physical resources and the like usable for data transmission. The base station notifies each terminal of starting permission, finishing permission and the like of transmission of data using the CG. The terminal can transmit data to the base station using the physical resource designated about the CG, with no negotiation between the terminal and the base station before data transmission. The CG is expected as a technology of achieving low-latency communication.

In the environment where the CG is used, the base station does not control data transmission timing of the terminal. Accordingly, the number N is limited that can be set such that the number of signals transmitted from the terminals and reaching the base station at the same timing (the number of transmission signals (the number of terminals): N) does not exceed the number of reception antennas (M) of the base station. A state where the limitation on N is cancelled and the number of reception antennas M exceeds the number of terminals N (N>M) is called overloaded MIMO. In an environment of overloaded MIMO, there is a possibility that the number of errors during desired signal during demodulation increases owing to effects of N–M interference signals incapable of being cancelled even by diversity reception. The problem of the possibility of occurrence of errors during demodulation in the overloaded MIMO is a problem that can also occur in an environment of using what is other than the CG with the limitation on N being cancelled.

As measures against the overloaded MIMO, a signal separation process due to maximum likelihood detection (MLD) or an MLD-applied technology has been proposed. A method of using spatial filtering has also been proposed. For further information, see documents below.

[Non Patent Document 1] "NR Physical Layer Specifications in 5G," NTT DOCOMO Technical Journal Vol. 26 No. 3 (November 2018)

[Non Patent Document 2] Suzuki, "Signal Transmission Characteristics of Diversity Reception with Least-Squares Combining-Relationship between Desired Signal Combining and Interference Cancelling-," Transactions of the Institute of Electronics, Information and Communication Engineers, B-II Vol. J75-B-II, No. 8, pp. 524-534, August, 1992

[Non Patent Document 3] Hayakawa, Hayashi, and Kaneko, "A Reduced Complexity Signal Detection Scheme for Overloaded MIMO Systems Using Slab Decoding and Lattice Reduction," Institute of Electronics, Information and Communication Engineers Technical Report, RCC2015-16, MICT2015-16, pp. 77-82, May, 2015

[Non Patent Document 4] Higuchi, and Taoka, "Multi Antenna Wireless Transfer Technology III Signal Separation Technology in MIMO Multiplexing Method," NTT DoCoMo Technical Journal Vol. 14 No. 1, pp. 66-75, April, 2006

SUMMARY

There are, however, cases to which MLD is difficult to be applied; for example, the cases include a system and the like that perform equalization in a frequency area in single carrier transmission. Use of spatial filtering is accompanied by a preprocess (special process), which complicates and tangles the processing.

The present disclosure has an object to provide a wireless communication control method, a receiving station, and a program that are capable of suppressing increase in error during decoding in overloaded MIMO.

The present disclosure is a wireless communication control method suppressing interference using a minimum mean square error (MMSE) weight in an environment of wireless communication where the number of transmission stations transmitting a wireless signal to a receiving station is larger than the number of reception antennas of the receiving station. The wireless communication control method includes: calculating, by the receiving station, power of an interference signal included in a signal received by the receiving station from the transmission stations the number of which is larger than the number of reception antennas, the interference signal corresponding to a part by which the number of transmission stations exceeds the number of reception antennas; calculating, by the receiving station, an MMSE weight depending on the power of the interference signal; and recalculating, by the receiving station, the power of the interference signal using the MMSE weight depending on the power of the interference signal, and the MMSE weight depending on the recalculated power of the interference signal.

The present disclosure may include the receiving station according to the wireless communication control method described above, a program executed by a computer of the receiving station, and a non-transitory storage medium to store the program.

According to the disclosed embodiment, increase in error during decoding in overloaded MIMO can be suppressed.

BRIEF DESCRIPTION OF THE DRAWINGS

FIG. 8 illustrates definition of symbols used for weight calculation;

FIG. 9 is a table exemplifying a simulation condition;

DESCRIPTION OF THE EMBODIMENTS

A wireless communication control method according to the embodiment suppresses interference using a minimum mean square error (MMSE) weight in an environment of wireless communication where the number of transmission stations transmitting a wireless signal to a receiving station is larger than the number of reception antennas of the receiving station. The wireless communication control method includes the following.
(1) The receiving station calculates power of an interference signal included in a signal received by the receiving station from the transmission stations the number of which is larger than the number of reception antennas, the interference signal corresponding to a part by which the number of transmission stations exceeds the number of reception antennas.
(2) The receiving station calculates an MMSE weight depending on the power of the interference signal.
(3) The receiving station recalculates the power of the interference signal using the MMSE weight depending on the power of the interference signal, and the MMSE weight depending on the recalculated power of the interference signal.

The wireless communication control method according to the embodiment calculates an MMSE weight (in consideration of power) depending on the power of an interference signal corresponding to a part by which the number of transmission stations exceeds the number of reception antennas. In other words, the wireless communication control method according to the embodiment calculates the MMSE weight in consideration of power incapable of being suppressed (cancelled) by use of an MMSE weight obtained by a typical method of calculating the MMSE weight. Accordingly, interference can be suppressed more preferably than by suppression through use of a typical MMSE weight, and can suppress increase in error during demodulation.

Figure 1:
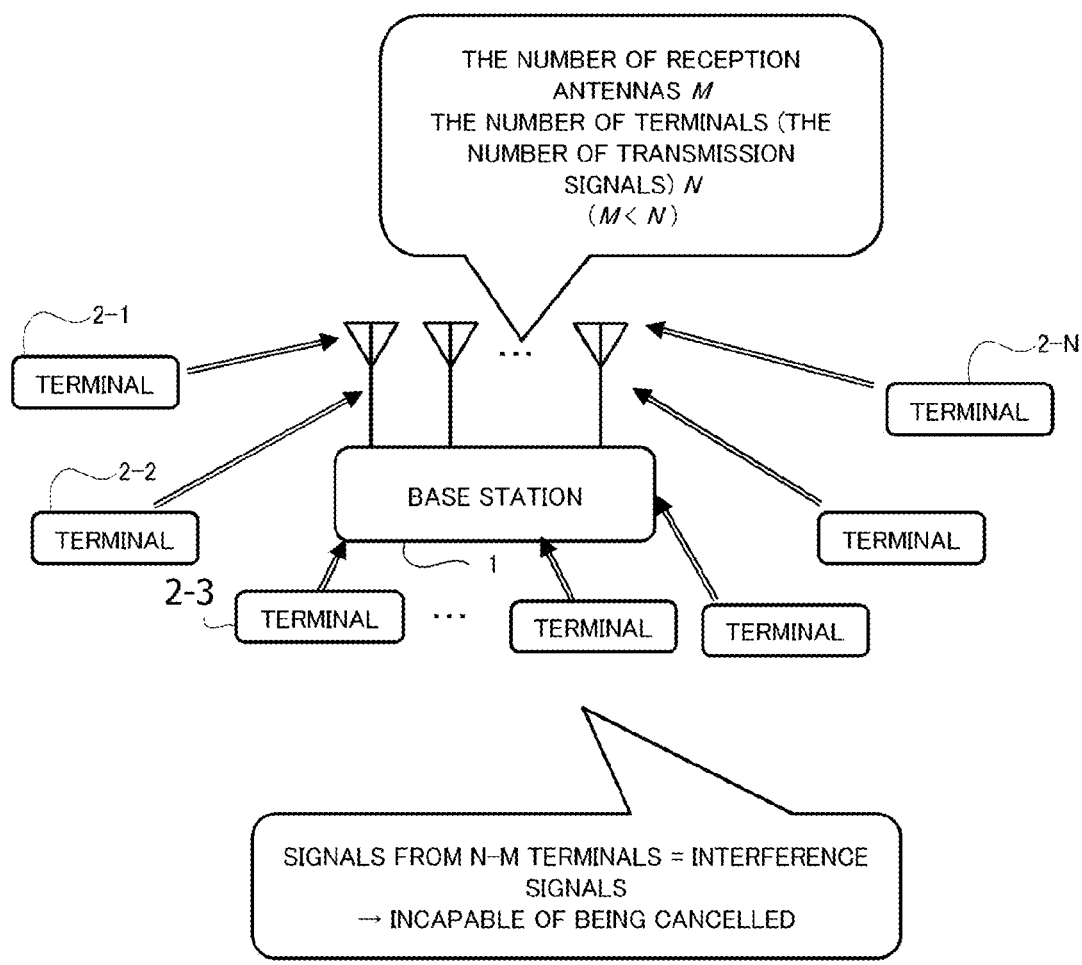
FIG. 1 is a diagram illustrating a configuration example of a wireless communication system according to an embodiment.

Hereinafter, referring to the drawings, a wireless communication control method of a wireless communication system, a receiving station included in the wireless communication system, and a program executed in the receiving station, according to the embodiment, are described. The configuration in the embodiment is an example. There is no limitation by the configuration of the embodiment. FIG. 1 a diagram illustrating a configuration example of a wireless communication system according to an embodiment.

In FIG. 1, the wireless communication system includes a base station 1 that includes multiple reception antennas, and multiple terminals 2-1, 2-2, . . . , 2-N that wirelessly communicate with the base station 1. When the terminals 2-1 to 2-N are described without discrimination, the terminals are called "terminals 2". The base station 1 is an example of "receiving station". Each of the terminals 2 is an example of a "transmission station". Note that the terminal 2 can serve as a receiving station, and the base station 1 can serve as a transmission station in some cases.

According to the embodiment, in multi-user MIMO, the terminals 2 can communicate using CG, and a state where the number of reception antennas M of the base station[1] is exceeded by the number N of terminals 2, i.e., a wireless communication system causing overloaded MIMO, is exemplified. The overloaded MIMO can be regarded as a state where the receiving station receives signals arriving from transmission stations the number of which exceeds the number of reception antennas of the receiving station. Note that the capability of data transmission by the terminal 2 through use of CG is not compulsory.

The terminal 2 is called a wireless communication terminal or a wireless terminal. For example, the terminal 2 is used to collect data for IoT, and transmit the collected data to the base station 1. However, the usage of the terminal 2 is not limited.

Figure 2:
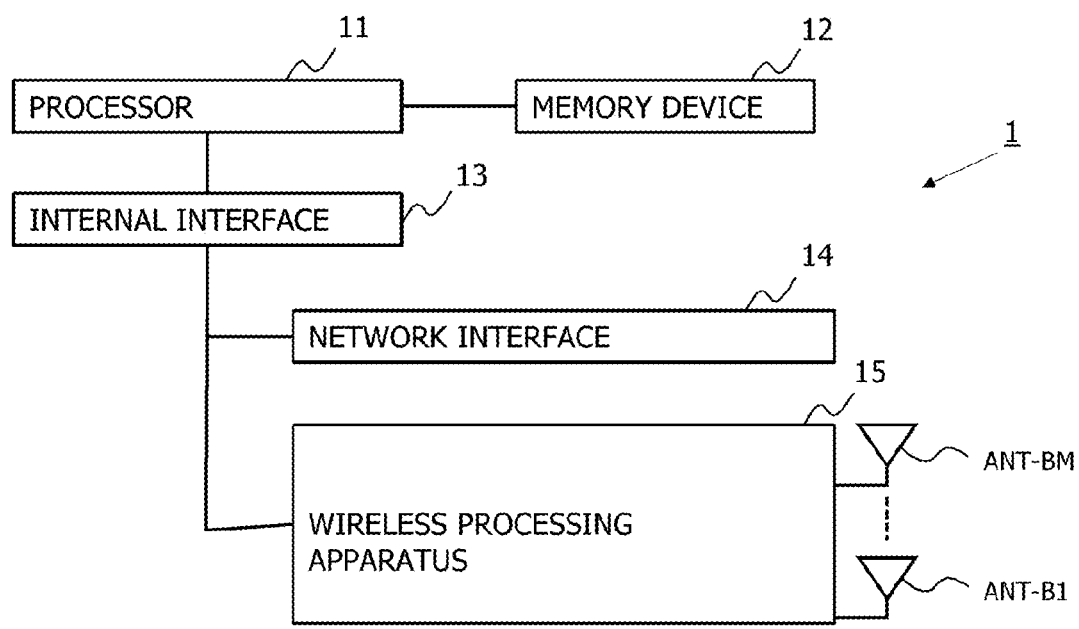
FIG. 2 is a diagram illustrating a hardware configuration example of a base station.

FIG. 2 is a diagram illustrating a hardware configuration example of the base station 1. In FIG. 2, the base station 1 includes a processor 11, a memory device 12, an internal interface (internal IF) 13, a network interface (network IF) 14, and a wireless processing device 15.

The processor 11 is, for example, a central processing unit (CPU) (also called a microprocessor unit (MPU)). The processor 11 may have a single-processor configuration, or a multi-processor configuration. A single physical CPU connected by a single socket may have a multi-core configuration. The processor 11 may include an operation device having any of various circuit configurations, such as of a digital signal processor (DSP) or graphics processing unit (GPU). The processor 11 may have a configuration that cooperates with at least one of an integral circuit (IC) and other digital circuits, and analog circuits. The integrated circuit encompasses an LSI, an application specific integrated circuit (ASIC), and a programmable logic device (PLD). The PLD encompasses, for example, a field-programmable gate array (FPGA). For example, the processor 11 may be what is called a micro controller (MCU), SoC (system-on-a-chip), a system LSI, or a chip set. The processor 11 is an example of a control device or a controller.

The memory device 12 is used as a deployment area for a string of instructions (computer program) to be executed by the processor 11, a memory area for programs and data, a working area for the processor 11, and a buffer area for communication data. The memory device 12 is one of examples of a non-transitory storage medium.

The memory device 12 includes a main memory (called a memory), and an auxiliary memory. The main memory includes a random access memory (RAM), or a RAM, and a read only memory (ROM). The auxiliary memory encompasses a random access memory (RAM), a hard disk (HDD), a solid state drive (SSD), a flash memory, and an electrically erasable programmable read-only memory (EEPROM). Note that the type of the memory device 12 is not limited to what is described above.

The processor 11 executes a program stored in the memory 12, thereby operating as a device also called a base band unit (BBU). The BBU performs a process of encoding and modulating data and generating a baseband signal, and an inverse process thereof (a process of converting the baseband signal into data by demodulating and decoding the baseband signal). The base band unit can also be called a control unit.

The internal IF 13 is a circuit that connects various peripheral devices to the processor 11. The network IF 14 is a communication device (circuit) for allowing the base station 1 to access a network to which other base stations (base stations other than the base station 1) are connected. The network to which base stations other than the base station 1 are connected is also called a backhaul. The backhaul is, for example, a wired network through optical communication.

The wireless processing device 15 includes a transceiver and a receiver. The transceiver and the receiver are connected to transceiving antennas ANT-B 1, . . . , ANT-BM via duplexers. Note that the bidirectionality of the antenna for transmission and reception is not compulsory. When the antennas ANT-B 1, . . . , ANT-BM are not discriminated from each other, the antennas are represented as antennas ANT.

The transceiver includes a circuit that converts the baseband signal (digital signal) into an analog signal, a circuit that converts the analog signal into a wireless signal, and a power amplifier that amplifies the wireless signal. The receiver includes a low-noise amplifier that applies low-noise amplification to the wireless signal, a circuit that converts the wireless signal into the analog signal, and a circuit that converts the analog signal into the digital signal (baseband signal). The wireless processing device 15 may adopt a configuration that includes N series of transceivers and receivers the number of which is equal to the number of antennas ANT.

The wireless processing device 15 performs conversion between the baseband signal and the wireless signal, and an inverse process thereof. Accordingly, this device is also called a wireless device, or a wireless circuit. The wireless processing device 15 may have a configuration where the base band unit (BBU) is connected to a wired network through optical communication, and is installed at a remote place. In this case, the wireless processing device 15 is called a remote radio head (RRH). Alternatively, a configuration where multiple remote radio heads are connected to one base band unit may be adopted. Note that the network that connects the base band unit and the remote radio heads to each other is also called a fronthaul.

Figure 3:
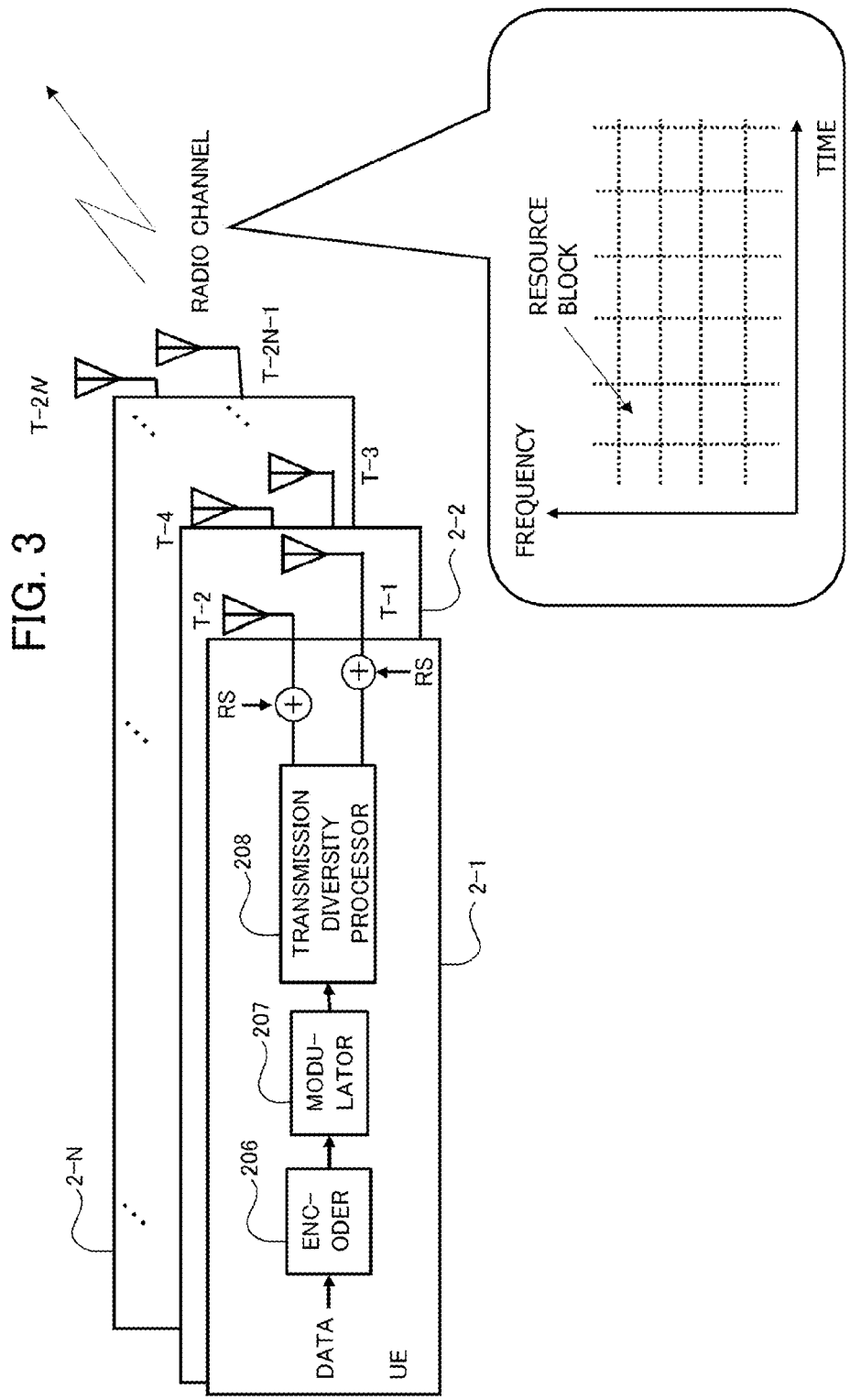
FIG. 3 is a diagram illustrating a configuration example of a terminal.

FIG. 3 is a diagram illustrating a configuration example of the terminal 2. In FIG. 3, together with the configuration of the terminal 2, wireless resource blocks are exemplified. The wireless resource blocks are parts divided by the frequency of the subcarrier allocated to the terminal 2, and the temporal axis. The wireless resource blocks for communication using CG have already been known by the terminals 2. Even without allocation of the wireless resource blocks by the base station 1, the terminals 2 can transmit data using the resource blocks for CG.

In FIG. 3, the multiple terminals 2 (2-1, . . . , 2-N) are exemplified. The detailed configuration of each terminal 2 is illustrated in the terminal 2-1. In the example illustrated in FIG. 3, each terminal 2 includes two (a pair of) antennas. For example, the terminal 2-1 includes antennas T-1 and T-2. The terminal 2-N includes antennas T-2N-1 and T-2N. In the following description, when the antennas included in the terminals 2-1 to 2-N are indicated without discrimination, the antennas are represented as "antenna(s) T". Note that the number of antennas T included in the terminal 2 is not limited to two.

The terminal 2 is sometimes called user equipment (UE). The terminal 2 includes a processor, a memory, an internal IF and a wireless processing device that are similar to the processor 11, the memory device 12, the internal IF 13 and the wireless processing device 15 that the base station 1 includes. The wireless processing device is connected to the antenna T. The processor of the terminal 2 executes the program stored in the memory device, thereby allowing the terminal 2 to serve as an encoder 206, a modulator 207 and a transmission diversity processor 208 in the wireless communication.

The encoder 206 applies error correction coding to data (transmission data) transmitted from the terminal 2. The error correction code may be a soft-decision code or a hard-decision code. There is no limitation to the type of encoding. The modulator 207 digitally modulates the error-correction-coded data. The scheme of digital modulation may be, for example, any of quadrature amplitude modulation (QAM), phase shift keying (PSK), frequency shift keying (FSK) and the like.

The transmission diversity processor 208 separates the digitally modulated signal to multiple signals, and forms transmission diversity branches. The transmission diversity processor 208 emits the signals separated to multiple branches, from the antennas T through the wireless processing device. In the example of FIG. 3, the transmission diversity processor 208 of each terminal 2 separates the transmission path by two antennas, and forms transmission diversity branches.

A reference signal (RS) is added to each of the separated signals. The RS is generally called a pilot signal, and is a signal having already been known by the base station 1. RSs different on a terminal-by-terminal basis are transmitted, thereby allowing the base station 2 to identify the source terminals 2 by referring to the RSs. Note that the terminal 2 performs transmission diversity through the transmission diversity processor 208. However, the transmission diversity is not compulsory. For example, a configuration may be adopted where the terminal 2 uses one antenna for transmission and does not perform transmission diversity. The number of series of signals separated by the transmission diversity may be two or more depending on the number of antennas.

Figure 4:
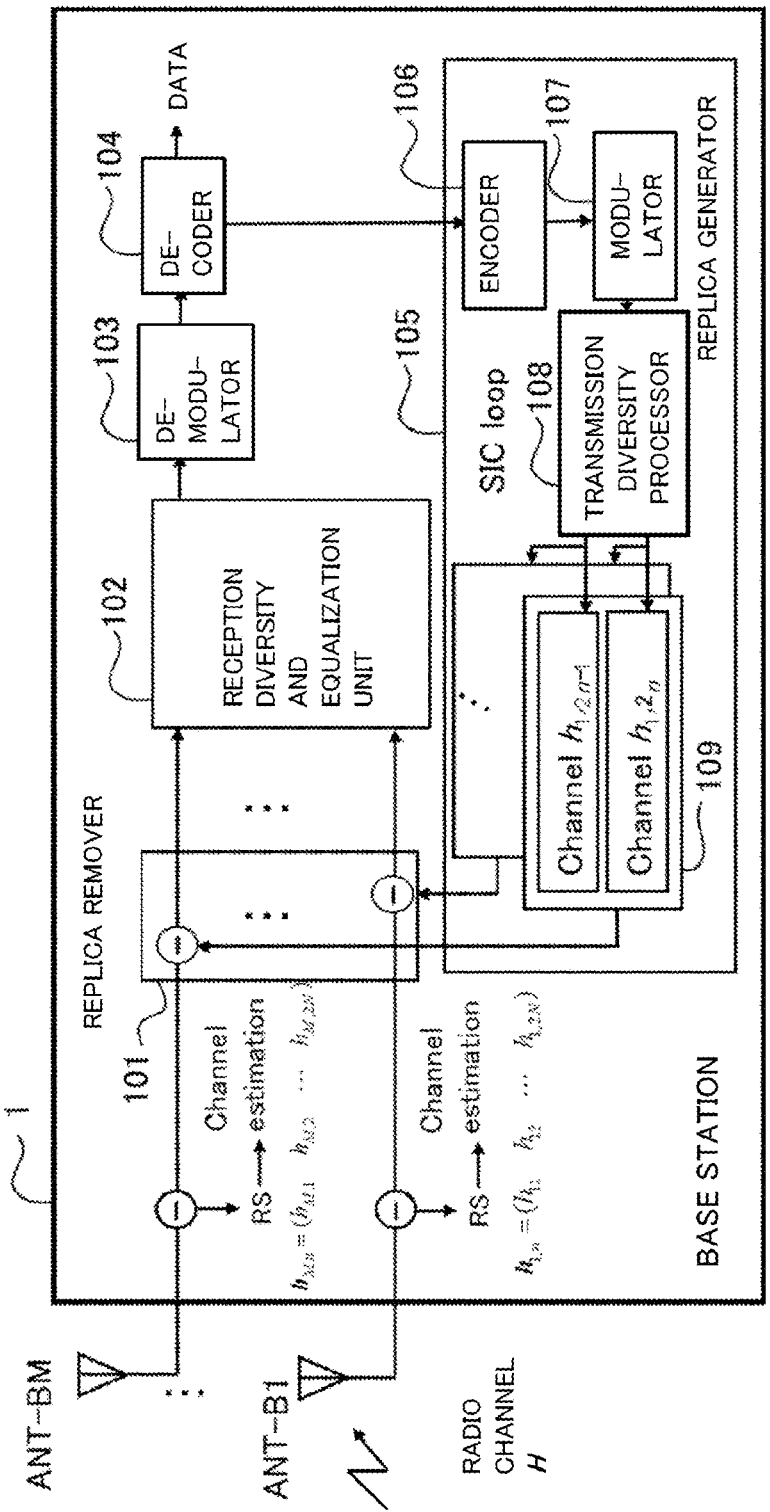
FIG. 4 is a diagram illustrating a configuration example of the base station.

FIG. 4 illustrates a configuration example of the base station 1. The processor 11 executes the program stored in the memory device 12, thereby allowing the base station 1 to operate as an apparatus that performs processes illustrated in FIG. 4. That is, the base station 1 operates as the apparatus that includes a replica remover 101, a diversity reception and equalization unit 102, a demodulator 103, a decoder 104, and a replica generator 105. The replica generator 105 operates as a device that includes an encoder 106, a modulator 107, a transmission diversity processor 108, and a channel matrix multiplier 109.

In the base station 1, RSs are extracted from the respective signals received from the M antennas ANT (ANT-B1 to ANT-BM). The RS is used to identify the terminal 2, and to estimate the channel for the signal from the terminal 2. The reception diversity and equalization unit 102 performs reception diversity and equalization using the minimum mean square error (MMSE). That is, the reception diversity and equalization unit 102 generates a channel matrix from channel estimation values using the RS of a desired signal, and calculates an MMSE weight for suppressing interference from other transmission antenna branches with respect to each corresponding transmission antenna branch. Furthermore, the reception diversity and equalization unit 102 multiplies the reception signal vector by the MMSE weight matrix, thereby obtaining an equalized signal with interference being suppressed.

The demodulator 103 calculates the log-likelihood ratio (LLR), on a bit-by-bit basis, from the squared Euclidean distance between the equalized signal and a transmission signal point replica. The decoder 104 performs error correction decoding using LLR, and decodes the data.

The replica generator 105 performs a process of generating a replica of the desired signal, from data obtained by the decoder 104. That is, the replica generator 105 generates the replica of the desired signal through the encoder 106, the modulator 107, the transmission diversity processor 108, and the channel matrix multiplier 109. The replica remover 101 removes the desired signal from the signal received by the base station 1 using the replica. This is called an SIC (successive interference canceller) loop. A successfully demodulated and decoded signal (an interference replica of the transmission signal) is removed from the incoming signal (reception signal), thereby allowing the interference signal with respect to the desired signal to be reduced. According to this embodiment, the desired signals are selected in a descending order of the signal-to-interference ratio (SIR) from among signals received by the base station 1 from N terminals 2. Note that the selection order of the desired signals may be according to that other than the SIR order.

Figure 5:
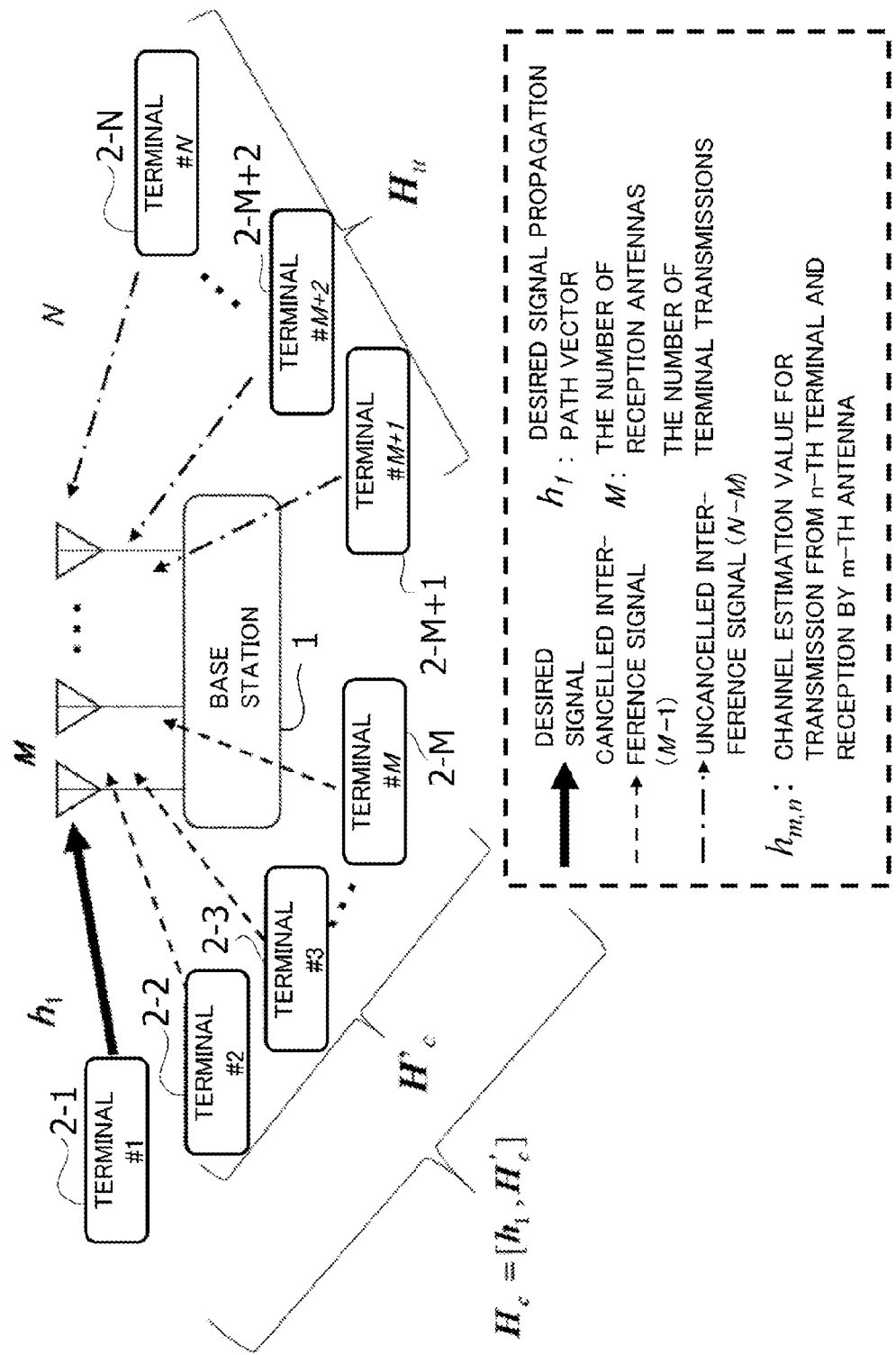
FIG. 5 a diagram illustrating a case of diversity reception of a desired signal in an overloaded MIMO.
Figure 6:
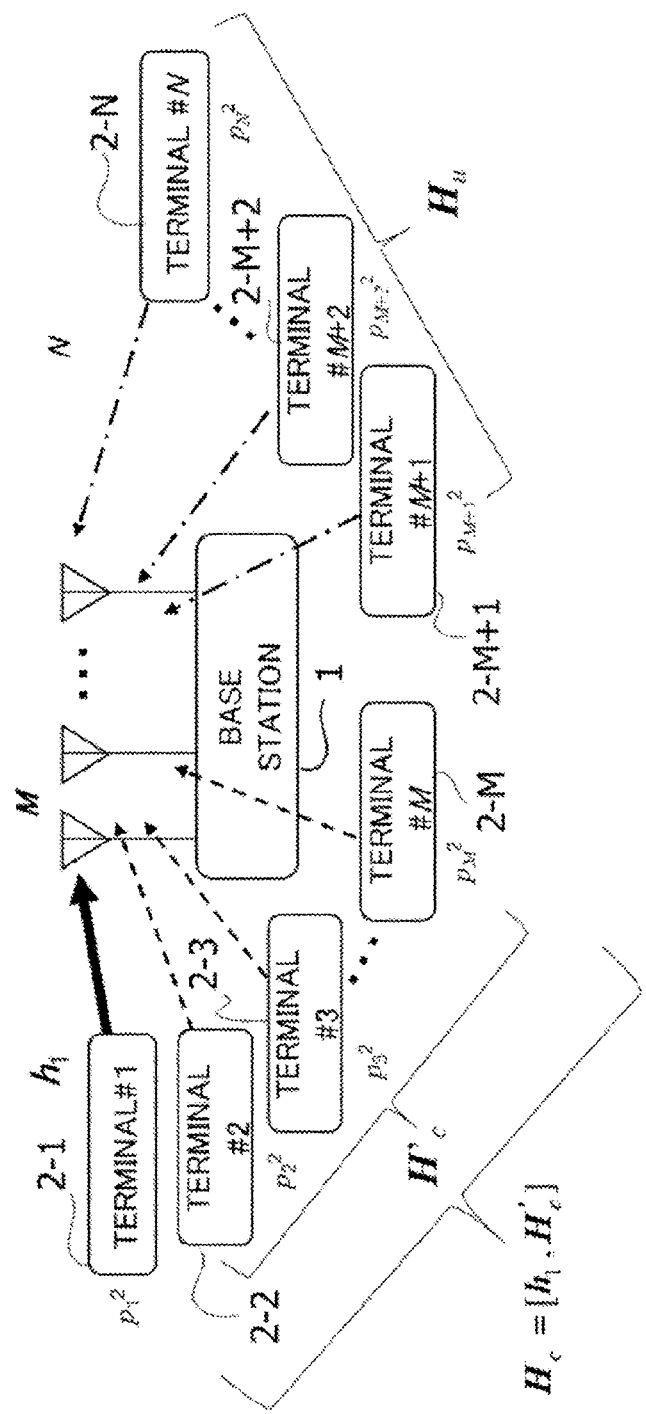
FIG. 6 a diagram illustrating a case of diversity reception of a desired signal in the overloaded MIMO.

FIGS. 5 and 6 illustrate an overloaded MIMO state. According to the overloaded MIMO, signals from terminals 2 the number of which is larger than the number of reception antennas M of the base station 1 have arrived. The channel matrix H in this case can be represented by the following expression (1).

[Expression 1]

$$H = [H_c, H_u] = \begin{pmatrix} fli,1 & fli,2 & \ldots & fli,N \\ li,i & hi,2 & \ldots & h2,N \\ \vdots & \vdots & \ddots & \vdots \\ hMJ & hM,2 & \ldots & hM,N \end{pmatrix} \quad (1)$$

The channel matrix H is a matrix indicating the variation amounts of amplitudes and phases of transmission paths between the antennas Tl to TN of the terminals 2 and the antennas ANT-B1 to ANT-BM of the base station 1. The channel matrix H is determined by receiving the RSs transmitted from the antennas 2j-1, 2j (j=l, . . . , N) of the terminals 2 through the antennas ANT-B1 to ANT-BM. This similarly applies to cases where the number of antennas of each terminal 2 is different from two. In brief, the variation amount corresponding to the transfer function of the transmission path can be obtained depending on the reference signal transmitted and received between the transmission-side antennas 2j-1 and 2j and the reception-side antenna ANT-Bi. $h_{m,n}$ in the channel matrix H indicates the channel estimation value about what is transmitted from the n-th terminal among the terminals 2, and received by the m-th antenna ATN in the base station 1.

The channel matrix H is a matrix indicating the variation amounts of amplitudes and phases of transmission paths between the antennas T of the terminals 2 and the reception antennas ANT-B1 to ANT-BM of the base station 1. The transmission signal vector of each antenna T of the terminal 2 is multiplied by the channel matrix H, which can obtain the estimation values of the reception signal vectors at the reception antennas ANT-B1 to ANT-BM of the base station.

According to this embodiment, the RSs are orthogonal so as not to interfere with each other between the terminals 2. Since the RSs are orthogonal, the base station 1 can estimate the channel matrix H from the RSs even in an overloaded MIMO state.

In the overloaded MIMO, the number N of terminals 2 exceeds the number of reception antennas M. Any of the signals of the terminals the number of which is N (e.g., the signal of the terminal 2-1) is assumed as the desired signal (indicated by thick arrows in FIGS. 5 and 6). In this case, the signals of M−1 parts (the signals of the terminals 2-2 to 2-M) are signals that are suppressed (cancelled) according to an MMSE method (indicated by broken arrows in FIGS. 5 and 6). The signals of N−M parts (the signals of the terminals 2-M+1 to 2-N) are signals that are not suppressed (cancelled) according to the MMSE method (indicated by chain-line arrows in FIGS. 5 and 6).

Accordingly, the channel matrix H includes a transmission path vector $H_c$, and a transmission path vector $H_u$. The transmission path vector $H_c$ is a transmission path vector (channel matrix) that includes the transmission path vector $h_1$ of the desired signal, and the transmission path vector (channel matrix) $H'_c$ of the signals to be cancelled. The transmission path vector $H_u$ is the transmission path vector (channel matrix) of the signal not to be cancelled. The matrix of the transmission path vector He is represented by the following expression (2). The transmission path vector of the desired signal $h_1$ is represented by an expression (3). The transmission path vector $H'_c$ is represented by the following expression (4).

[Expression 2]

$$H_c = \begin{pmatrix} h_{1,1} & h_{1,2} & \ldots & h_{1,M} \\ h_{2,1} & h_{2,2} & \ldots & h_{2,M} \\ \vdots & \vdots & \ddots & \vdots \\ h_{M,1} & h_{M,2} & \ldots & h_{M,M} \end{pmatrix} \quad (2)$$

$$h_1 = (h_{1,1}, h_{2,1}, \ldots, h_{M,1})^T \quad (3)$$

$$H'_c = \begin{pmatrix} h_{1,2} & h_{1,3} & \ldots & h_{1,M} \\ h_{2,2} & h_{2,2} & \ldots & h_{2,M} \\ \vdots & \vdots & \ddots & \vdots \\ h_{M,2} & h_{M,3} & \ldots & h_{M,M} \end{pmatrix} \quad (4)$$

The transmission path vector (channel matrix) $H_u$ not to be cancelled is represented by the following expression (5).

[Expression 3]

$$H_u = \begin{pmatrix} h_{1,M+1} & h_{1,M+2} & \ldots & h_{1,N} \\ h_{2,M+1} & h_{2,M+2} & \ldots & h_{2,N} \\ \vdots & \vdots & \ddots & \vdots \\ h_{M,M+1} & h_{M,M+2} & \ldots & h_{M,N} \end{pmatrix} \quad (5)$$

According to the typical MMSE method, the MMSE weight that suppresses (cancels), as the interference signal, the signal of "M−1" parts the number of which is obtained by subtracting one from the number of reception antennas M. However, according to the overloaded MIMO, the signal of "N−M" parts the number of which is obtained by subtracting the number M of antennas from the number N of terminals 2 is not suppressed (cancelled). Consequently, there is a possibility of increase in the error rate during demodulation according to the MMSE equalization through the typical MMSE method.

According to this embodiment, the reception diversity and equalization unit 102 calculates the weight (MMSE weight $W_{mmse}$) in consideration of the interference signal (the signal of N−M parts) uncanceled in the overloaded MIMO state. By this calculation, increase in the error rate during demodulation is suppressed.

Figure 7:
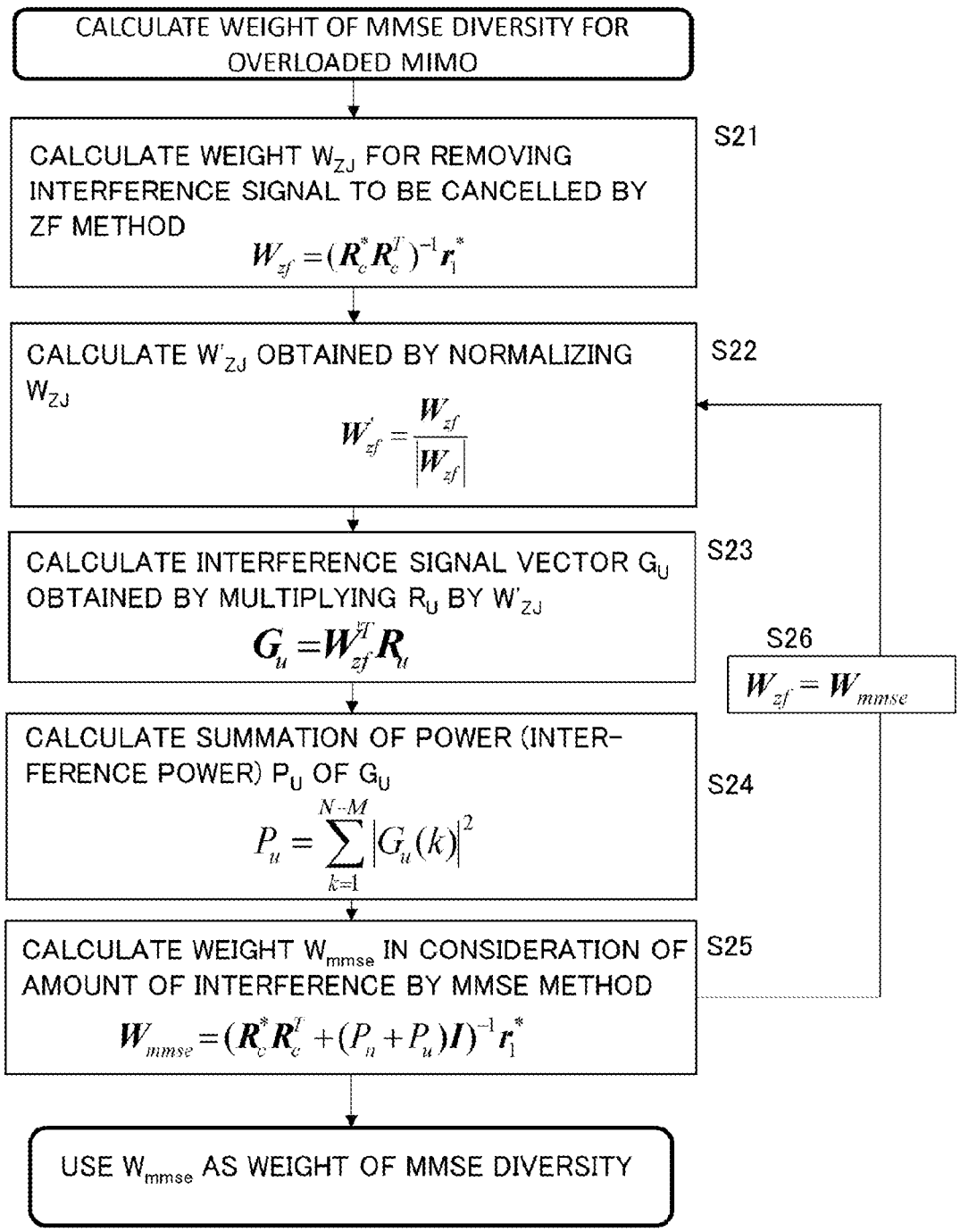
FIG. 7 is a flowchart illustrating an example of a weight calculation process in MMSE diversity.

FIG. 7 is a flowchart illustrating an example of a weight calculation process in MMSE diversity, the process being executed by the reception diversity and equalization unit 102 (the processor 11 operating as this unit). FIG. 8 illustrates definition of symbols and the like used for weight calculation indicated in FIG. 7.

In step S21, the processor calculates a weight $W_{zf}$ for removing the interference signal (the signal of "M−1" parts) to be cancelled by reception diversity using the zero forcing method (ZF method). The expression of calculating the weight $W_{zf}$ is indicated in the block of step S21. Here, $R_c$ indicates the transmission path vector multiplied by the transmission amplitude p of the desired signal and the signal to be cancelled, and $r_1$ indicates the transmission path vector multiplied by the transmission amplitude p of the desired signal. The symbol "T" indicates the transposed matrix, and the symbol "*" indicates the complex conjugate. By the following expression (6), $r_1$ can be represented. $R_c$ can be represented by the following expression (7). Note that as the first desired signal, for example, the signal having the highest SIR is selected from among the signals of the terminals 2 identifiable by RS. Note that the order of selecting the desired signal is not limited to the descending order of SIR.

[Expression 4]

$$r_1 = p_1 h_1 = (p_1 h_{1,1}, p_1 h_{2,1}, \ldots, p_1 h_{M,1})^T \quad (6)$$

$$R_c = [p_1 h_1, p_2 h_2, \ldots, p_M h_M] = \begin{pmatrix} p_1 h_{1,1} & p_2 h_{1,2} & \cdots & p_M h_{1,M} \\ p_1 h_{2,1} & p_2 h_{2,2} & \cdots & p_M h_{2,M} \\ \vdots & \vdots & \ddots & \vdots \\ p_1 h_{M,1} & p_2 h_{M,2} & \cdots & p_M h_{M,M} \end{pmatrix} \quad (7)$$

In step S22, the processor 11 calculates the weight $W'_{zf}$ obtained by normalizing the weight $W_{zf}$. The calculation expression of normalization is as illustrated in the block of step S22. In step S23, the processor 11 calculates the interference signal vector $G_u$ obtained by multiplying $R_u$ by the weight $W_{zf}$. The calculation expression of $G_u$ is as illustrated in the block of step S23. $R_u$ is a channel matrix obtained by multiplying the signal (the interference signal of "N−M" parts) that is uncanceled through the reception diversity, by the transmission amplitude p, and can be represented by the following expression (8).

[Expression 5]

$$R_u = [p_{M+1} h_{M+1}, p_{M+2} h_{M+2}, \ldots, p_N h_N] = \quad (8)$$

$$\begin{pmatrix} p_{M+1} h_{1,M+1} & p_{M+2} h_{1,M+2} & \cdots & p_N h_{1,N} \\ p_{M+1} h_{2,M+1} & p_{M+2} h_{2,M+2} & \cdots & p_N h_{2,N} \\ \vdots & \vdots & \ddots & \vdots \\ p_{M+1} h_{M,M+1} & p_{M+2} h_{M,M+2} & \cdots & p_N h_{M,N} \end{pmatrix}$$

In step S24, the processor 11 calculates the summation of the power (interference power) $P_u$ of the interference signal vectors $G_u$. The calculation expression of $P_u$ is as illustrated in the block of step S24. $P_u$ is the power of the signals of the terminals 2-M+1 to 2-N illustrated in FIG. 6 that are not cancelled, i.e., the sum of $p_{m+1}^2, \ldots, p_N^2$. The power per terminal is calculated as one in the calculation expression.

In step S25, the processor 11 calculates the weight $W_{mmse}$ in consideration of the amount of interference by the MMSE method. The calculation expression of $W_{mmse}$ is as illustrated in the block of step S25. The typical weight calculation expression considers $P_n$, i.e., the noise power per reception antenna. Meanwhile, according to this embodiment, in addition to $P_n$, the power $P_u$ of (the part, by which the number N of terminals 2 exceeds the number of reception antennas M, of) the interference signal that is not cancelled by the reception diversity is considered. Consequently, the signal of the terminals 2 concerned can be suppressed as the interference signal.

According to the calculation expression of the MMSE weight $W_{mmse}$ illustrated in the block of step S25, the value of $W_{mmse}$ depends on the power $P_u$ of N−M terminals 2. Consequently, in step S26, the processor 11 sets the current value of $W_{mmse}$ to the value of $W_{zf}$, and the processing returns to step S22. Accordingly, in step S22 to S25, the new value of $W_{mmse}$ is calculated (updated). According to this embodiment, the value of $W_{mmse}$ calculated at the second time is used for multiplication of suppression of the interference signal.

Subsequently, by the replica generator 105 and the replica remover 102, the desired signal $h_1$ is removed from the incoming signal using a replica of the desired signal $h_1$. The next desired signal $h_2$ is then selected; for this desired signal $h_2$, the interference signal is suppressed using the weight $W_{mmse}$ calculated by the process illustrated in FIG. 7. The process according to such an SIC loop is repeated. Note that in the situation where MIMO is not overloaded, i.e., where the number N of terminals 2 is equal to or less than the number of reception antennas M, there is no $R_u$. Accordingly, the power $P_u$ is not calculated, and weight calculation according to the typical MMSE method is performed.

Note that in the process illustrated in FIG. 7, $W_{zf}$ is used to obtain the initial value of the power $P_u$. Alternatively, the calculation result of the calculation expression (W= $(R_c^* R_c^T + (P_n) I)^{-1} r_1^*$) of the typical MMSE weight may be used instead of Wzf.

Figure 10:
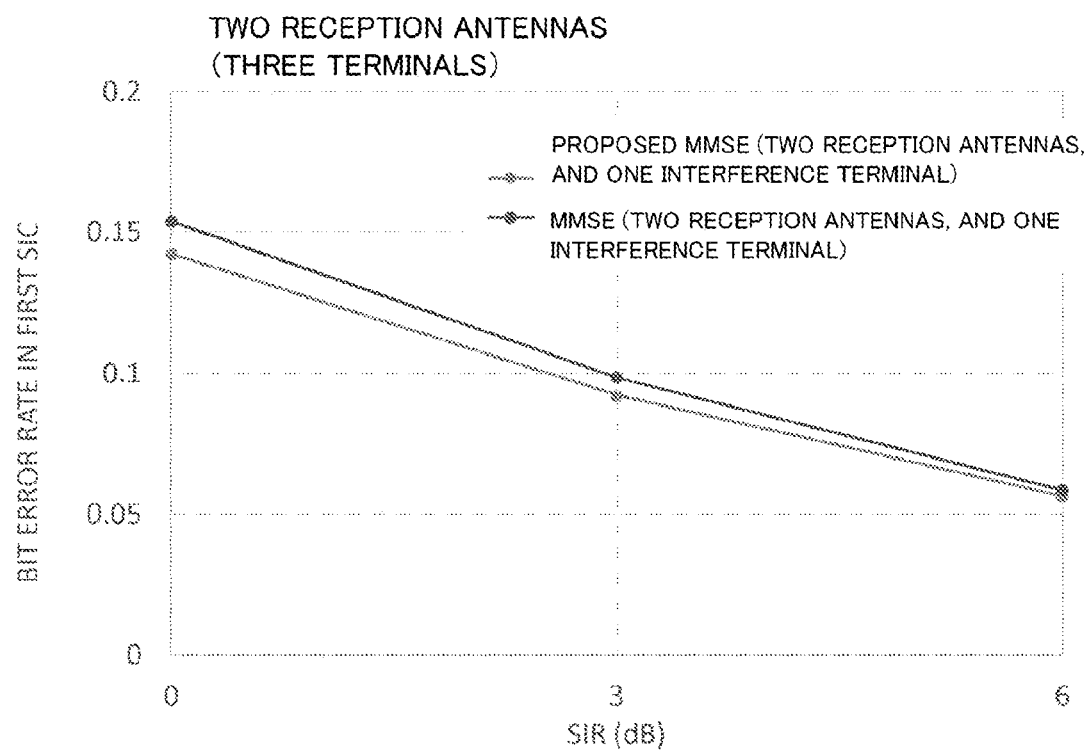
FIG. 10 is a diagram illustrating a bit error rate difference depending on presence or absence of weight calculation in the simulation.
Figure 11:
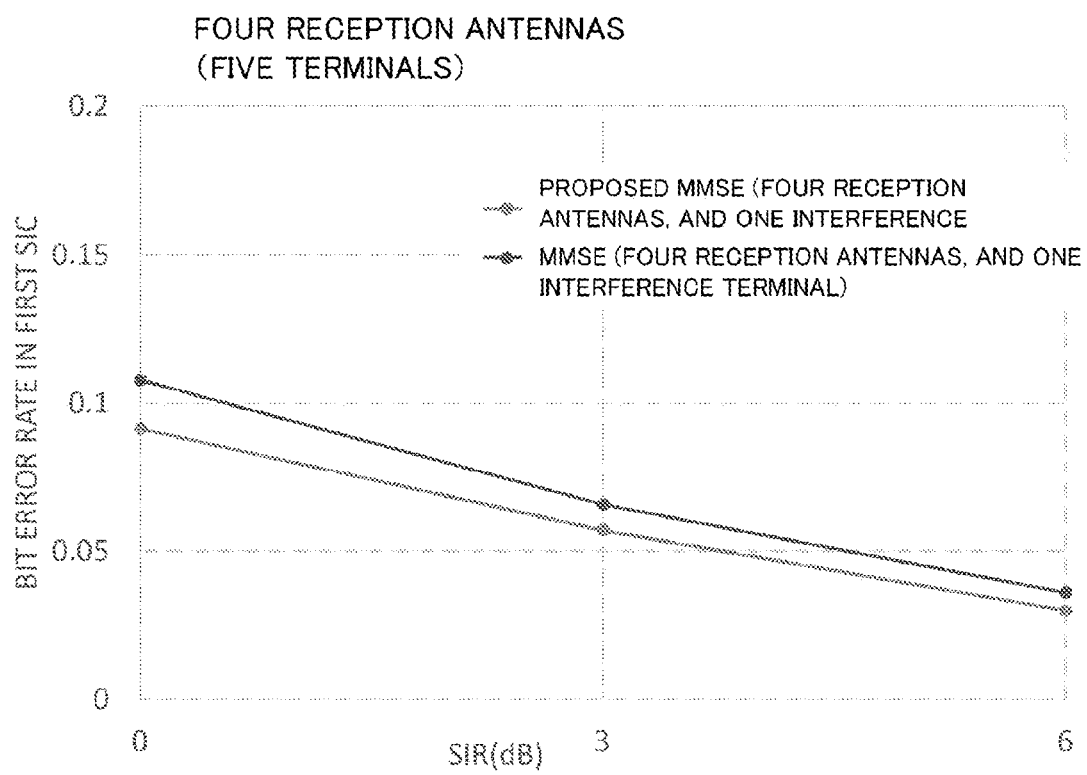
FIG. 11 is a diagram illustrating the bit error rate difference depending on presence or absence of weight calculation in the simulation.

FIGS. 9 to 11 exemplify simulation results according to the process of this embodiment. FIG. 9 exemplifies the condition of the simulation. The simulation is performed for a case where the number of simultaneous transmission terminals is 3 to 6 (two transmission antennas in each terminal 2), and a case where the number of simultaneous transmission terminals is 5 to 10 (four transmission antennas in each terminal 2).

The transmission data size is 80 bits. The error correction code is a turbo code (code rate of 1/3). The modulation scheme is the single carrier QPSK. It is assumed that the transmission path is single-path Rayleigh fading with the maximum Doppler frequency of 0 Hz. It is further assumed that the signal-to-noise power ratio (SIR) of the transmission path is 30 dB.

FIG. 10 exemplifies the difference of the first SIC bit error rate in a case of using a typical MMSE weight calculation method in the simulation, and a case of using the MMSE weight calculation method of this embodiment (according to this proposal). The example illustrated in FIG. 10 illustrates a case where the number of reception antennas of the receiving station (base station) is two and the number of terminals is three (the number of terminals exceeding the number of reception antennas is one (N−M=1)). Each graph in FIG. 10 is an example without transmission diversity. In FIG. 10, the abscissa axis indicates SIR (dB), and the ordinate axis indicates the bit error rate. In FIG. 10, the upper graph indicates a case of using the typical MMSE weight calculation method, and the lower graph indicates a case of using the MMSE weight calculation method according to this proposal. The example illustrated in FIG. 11 indicates a case where the number of reception antennas is four and the number of terminals is five (the number of terminals exceeding the number of reception antennas is one).

As illustrated in FIGS. 10 and 11, it is understood that application of the MMSE weight calculation method according to this proposal indicates a more favorable bit error rate irrespective of the value of SIR. That is, the calculation method according to this proposal can suppress the interference and suppresses the bit error rate more than the typical MMSE weight calculation method.

As described above, according to the wireless communication system (wireless communication control method) in the embodiment, in a case of intending to suppress interference by the MMSE diversity in the overloaded MIMO, the power $P_u$ of the signals of the terminals 2 corresponding to the parts (M-N parts) by which the number of terminals N exceeds the number of reception antennas M (step S24). The power $P_u$ is the sum of square norms of the interference signal vectors $G_u$ corresponding to N−M parts. The MMSE weight $W_{mmse}$ depending on the power $P_u$ is calculated (step S25).

According to this embodiment, to obtain the initial value of the power of $P_u$ of the interference signal, the initial value of the MMSE weight is set. The initial value of the MMSE weight can be obtained by calculating the weight $W_{zf}$ by the zero forcing method using a matrix $R_c$ (step S21). The matrix $R_c$ is a matrix obtained by multiplying the channel matrix $H_c$ of these terminals 2 by the transmission amplitude p of the signals of the terminal 2 corresponding to the transmission terminals of the desired signals and the parts the number of which is (M−1) that is the number smaller by one than the number of reception antennas M. Note that the initial value of the weight may be obtained by the MMSE weight calculation method (typical MMSE weight calculation method) for the transmission terminal of the desired signal (first SIC desired signal) and the parts the number of which is (M−1) that is the number smaller by one than the number of reception antennas M.

When the MMSE weight $W_{mmse}$ depending on the power $P_u$ using the initial value of the power $P_u$ (step S25), the value is set as the initial value of the MMSE weight (step S26), and the power $P_u$ is recalculated (step S24). Accordingly, a more appropriate weight $W_{mmse}$ is calculated, and the channel matrix is multiplied by the weight. Accordingly, the interference in the overloaded MIMO can be appropriately suppressed, and the error rate during demodulation can be suppressed (see FIGS. 10 and 11).

The calculated value of $P_u$ can be used to calculate the log-likelihood ratio (LLR) used to demodulate the error correction code during demodulation, and the error rate after error correction can be reduced in comparison with a case without using $P_u$.

In this embodiment, according to the SIC method, the signal with the highest SIR among the signals of the N terminals is identified as the first desired signal. The MMSE equalization result for the desired signal is output from the reception diversity and equalization unit 102, and used for demodulation and decoding. A replica of the first desired signal is generated, and the first desired signal is removed from N incoming signals, using the replica. The calculation of the MMSE weight according to this embodiment is applicable to all the second desired signals and thereafter.

Note that the method of calculating the MMSE weight according to this embodiment is also applicable to the typical MMSE method other than the SIC method, i.e., a case where MMSE equalization results for individual transmission signals are calculated in parallel. The factor of occurrence of the overloaded MIMO is not limited to use of CG. Even when the number of terminals N of signals from one terminal (transmission station) exceeds the number of reception antennas M in the receiving station, the MMSE weight calculation method according to this embodiment is applicable. The configuration of the embodiment is an example. The configuration described in the embodiment can be appropriately changed in a range without departing from the spirit of the present disclosure.

What is claimed is:

1. A wireless communication control method suppressing interference using a minimum mean square error (MMSE) weight in an environment of wireless communication where the number of transmission stations transmitting a wireless signal to a receiving station is larger than the number of reception antennas of the receiving station, the method comprising:
    calculating, by the receiving station, power of an interference signal included in a signal received by the receiving station from the transmission stations the number of which is larger than the number of reception antennas, the interference signal corresponding to a part by which the number of transmission stations exceeds the number of reception antennas;
    calculating, by the receiving station, an MMSE weight depending on the power of the interference signal; and
    recalculating, by the receiving station, the power of the interference signal using the MMSE weight depending on the power of the interference signal, and the MMSE weight depending on the recalculated power of the interference signal.

2. The wireless communication control method according to claim 1, wherein in calculation of the power of the interference signal, an initial value of the power of the interference signal is calculated by multiplying, by an initial value of the MMSE weight, a channel matrix of the interference signal multiplied by a transmission amplitude.

3. The wireless communication control method according to claim 2, wherein in the calculation of the power of the interference signal, the initial value ($W_{ZF}$) of the MMSE weight is calculated by the receiving station using a zero forcing method.

4. A receiving station comprising a plurality of reception antennas and configured to suppress interference using a minimum mean square error (MMSE) weight in an environment where the number of transmission stations transmitting a wireless signal is larger than the number of the plurality of reception antennas, the receiving station comprising
    a controller configured to execute: calculating power of an interference signal included in a signal received by the receiving station from the transmission stations the number of which is larger than the number of reception antennas, the interference signal corresponding to a part by which the number of transmission stations exceeds the number of reception antennas; calculating an MMSE weight depending on the power of the interference signal; and recalculating the power of the interference signal using the MMSE weight depending on the power of the interference signal, and the MMSE weight depending on the recalculated power of the interference signal.

5. The receiving station according to claim 4, wherein in calculation of the power of the interference signal, the controller calculates an initial value of the power of the interference signal by multiplying, by an initial value of the MMSE weight, a channel matrix of the interference signal multiplied by a transmission amplitude.

6. The receiving station according to claim 5, wherein in the calculation of the power of the interference signal, the controller calculates the initial value of the MMSE weight using a zero forcing method.

7. A non-transitory storage medium storing a program causing computer of a receiving station comprising a plurality of reception antennas and configured to suppress interference using a minimum mean square error (MMSE) weight in an environment where the number of transmission stations transmitting a wireless signal exceeds the number of the plurality of reception antennas, the program causing the computer to execute:

calculating power of an interference signal included in a signal received by the receiving station from the transmission stations the number of which is larger than the number of reception antennas, the interference signal corresponding to a part by which the number of transmission stations exceeds the number of reception antennas;

calculating an MMSE weight depending on the power of the interference signal; and recalculating the power of the interference signal using the MMSE weight depending on the power of the interference signal, and the MMSE weight depending on the recalculated power of the interference signal.

8. The non-transitory storage medium according to claim 7, wherein the program causes the computer to execute a process, in calculation of the power of the interference signal, of calculating an initial value of the power of the interference signal by multiplying, by an initial value ($W'_{ZF}$) of the MMSE weight, a channel matrix of the interference signal multiplied by a transmission amplitude.

9. The non-transitory storage medium according to claim 8, wherein the program causes the computer to execute a process, in the calculation of the power of the interference signal, of calculating the initial value ($W_{ZF}$) of the MMSE weight using a zero forcing method.

* * * * *